US010294956B2

(12) United States Patent
Topaz et al.

(10) Patent No.: US 10,294,956 B2
(45) Date of Patent: May 21, 2019

(54) PROPELLER BLADE

(71) Applicant: SP TECH, St. Helen's, OR (US)

(72) Inventors: Stephen R. Topaz, St. Helen's, OR (US); Peter A. Topaz, Scappoose, OR (US); Warren L. Powers, Woodburn, OR (US)

(73) Assignee: SP Tech, St. Helen's, OR (US)

( * ) Notice: Subject to any disclaimer, the term of this patent is extended or adjusted under 35 U.S.C. 154(b) by 0 days.

(21) Appl. No.: 14/819,408

(22) Filed: Aug. 5, 2015

(65) Prior Publication Data

US 2015/0337854 A1 Nov. 26, 2015

Related U.S. Application Data

(63) Continuation of application No. 13/583,596, filed as application No. PCT/US2011/028882 on Mar. 7, 2011, now abandoned.

(Continued)

(51) Int. Cl.
*F01D 5/14* (2006.01)
*F04D 29/38* (2006.01)

(Continued)

(52) U.S. Cl.
CPC ............ *F04D 29/384* (2013.01); *B63H 1/26* (2013.01); *B64C 11/18* (2013.01); *F04D 29/181* (2013.01);

(Continued)

(58) Field of Classification Search
CPC . F01D 5/14; F01D 5/141; F01D 5/147; F05D 2240/30; F05D 2240/301;

(Continued)

(56) References Cited

U.S. PATENT DOCUMENTS 1,117,103 A 11/1914 Steinbach
1,597,175 A 8/1926 Boening (Continued)

FOREIGN PATENT DOCUMENTS

EP 1906028 4/2008
FR 414263 8/1910

(Continued)

OTHER PUBLICATIONS

International Search Report and Written Opinion issued in PCT/US2011/028882 dated Nov. 22, 2011.

(Continued)

*Primary Examiner* — Justin D Seabe
*Assistant Examiner* — Behnoush Haghighian
(74) *Attorney, Agent, or Firm* — Workman Nydegger

(57) ABSTRACT

A propeller blade includes a body configured to extend radially from the hub of a propeller. The body can include a front surface, a back surface, a leading edge, and a trailing edge. The top of the body can form a tippet that generally transitions the front and back surfaces from extending in a generally radial direction to a generally axial direction. The tippet can reduce radial flow and force losses, redirect the radial flow in an axial direction, reduce the exit flow area of the propeller, and increase the inlet flow area of the propeller. The front surface of the blade can have a planar configuration that prevents or reduces the creation of low or negative pressure across the front surface of the blade and associated cavitation.

20 Claims, 13 Drawing Sheets

Related U.S. Application Data

(60) Provisional application No. 61/315,792, filed on Mar. 19, 2010.

(51) Int. Cl.
*B63H 1/26* (2006.01)
*F04D 29/18* (2006.01)
*B64C 11/18* (2006.01)
*F04D 29/32* (2006.01)

(52) U.S. Cl.
CPC ............ *F01D 5/141* (2013.01); *F04D 29/324* (2013.01); *Y02E 10/721* (2013.01)

(58) Field of Classification Search
CPC ............. F05D 2240/307; F04D 29/384; F04D 29/181; B63H 1/26; B63H 1/14; B64C 3/14; B64C 3/141; B64C 2003/142–2003/149
USPC .............. 416/197 A, 197 R, 223 R, 228, 235
See application file for complete search history.

(56) References Cited

U.S. PATENT DOCUMENTS

| | | | | | |
|---|---|---|---|---|---|
| 2,684,654 | A | | 7/1954 | Johnson | |
| 2,978,040 | A | | 4/1961 | Wirkkala | |
| 3,782,857 | A | | 1/1974 | Svilans | |
| 4,560,358 | A | * | 12/1985 | Adler | A63H 33/18 244/34 A |
| 4,664,593 | A | | 5/1987 | Hayashi et al. | |
| 5,215,441 | A | | 6/1993 | Evans et al. | |
| 5,252,381 | A | | 10/1993 | Adler | |
| 5,437,541 | A | | 8/1995 | Vainrub | |
| 5,527,152 | A | * | 6/1996 | Coleman | F03D 7/0252 244/130 |
| 5,759,352 | A | * | 6/1998 | Lau | D21F 1/38 162/199 |
| 5,888,349 | A | * | 3/1999 | Lau | D21F 1/38 162/198 |
| 6,302,652 | B1 | | 10/2001 | Roberts | |
| 6,352,408 | B1 | | 3/2002 | Killian | |
| 6,901,873 | B1 | | 6/2005 | Lang et al. | |
| 7,025,642 | B1 | | 4/2006 | Baylor | |
| D560,154 | S | | 1/2008 | Aplin, Jr. | |
| 7,665,967 | B1 | * | 2/2010 | Parker | F04D 29/38 416/223 R |
| 7,927,071 | B2 | * | 4/2011 | Parker | F04D 29/38 416/223 R |
| 8,167,571 | B2 | * | 5/2012 | Bernatz | F03D 1/06 416/175 |
| 8,231,343 | B2 | | 7/2012 | Kayama et al. | |
| 8,360,731 | B2 | * | 1/2013 | Nash | F01D 5/141 416/223 A |
| 2007/0248466 | A1 | | 10/2007 | Lotrionte | |
| 2009/0226323 | A1 | | 9/2009 | Masahiko | |
| 2010/0140417 | A1 | * | 6/2010 | Bose | B64C 3/14 244/35 R |
| 2013/0045107 | A1 | | 2/2013 | Topaz et al. | |

FOREIGN PATENT DOCUMENTS

| | | |
|---|---|---|
| FR | 2822801 | 10/2002 |
| JP | 2003206894 | 7/2003 |

OTHER PUBLICATIONS

European Search Report issued in Application No. 11757021.8 dated Oct. 26, 2015.

* cited by examiner

PROPELLER BLADE

CROSS-REFERENCE TO RELATED APPLICATIONS

The present invention is a continuation application of U.S. Non-Provisional application Ser. No. 13/583,596 filed Sep. 7, 2012, which is a U.S. National Stage Application corresponding to PCT Patent Application No. PCT/US2011/028882, filed Mar. 17, 2011, which claims the benefit of priority to U.S. Provisional Application No. 61/315,792, filed Mar. 19, 2010. The entire contents of each of the aforementioned applications is incorporated by reference herein.

BACKGROUND OF THE INVENTION

1. The Field of the Invention

Implementations of the present invention relate to a propeller blades and systems and components employing propeller blades.

2. Discussion of the Relevant Art

Propellers are bladed rotating devices that move fluids. Typically, as the propeller rotates the device moves through the fluid. A pump is a propeller within a conduit, which moves fluid past itself. Conventional propellers and propeller blades are typically designed using a combination of the principles behind the Archimedes screw and the fluid dynamic principles of Bernoulli. Specifically, propellers typically replace the helical shape of an Archimedes screw with multiple blades to improve the entrance of the fluid into the shape of the device. Additionally, each of the blades in turn typically has a twisted airfoil shape.

The motion of the fluid over a conventional airfoil-shaped blade causes a low or even negative pressure on the top of the airfoil, or in other words, the front surface of the propeller blade. The combination of the positive force acting on the back surface of the blade and the low or negative pressure on the front surface of the blade causes the blade to move fluid. When the speed of a blade through a fluid is great enough, the fluid can vaporize into a gas (i.e., cavitation). The low pressure region created by the airfoil shape of conventional blades can be especially prone to cavitation. If the pressure of the liquid at any point along the low pressure surface drops below the vapor pressure of the liquid, the liquid will transform into gaseous bubbles. The presence of cavitation along any surface of a blade can be very harmful to the overall performance of the propeller. For example, cavitation can cause the propeller to stall, generate noise, cause erosion and other damage of components, cause vibration, and create a loss of efficiency.

In addition to cavitation, conventional propeller blades can cause fluid to flow radially outward and over the top edge of the blade. The fluid flow over the top edge of conventional blades can create eddies. These fluid eddies reduce the efficiency of the propeller and can give rise to significant noise. Furthermore, in the case of a pump, the radial force that conventional blades impart to the fluid can project the fluid into the walls of the conduit, thereby causing noise and a loss of efficiency.

Accordingly, there are a number of disadvantages in conventional propeller blades that can be addressed.

BRIEF SUMMARY OF THE INVENTION

Implementations of the present invention provide systems, methods, and apparatus that solve one or more problems in the art with improved propeller blades that reduce losses and increase efficiency. More specifically, one or more implementations of the present invention include propeller blades having a curved tippet along the top of the blade. The curved tippet can reduce force losses, redirect the radial flow in an axial direction, and otherwise increase efficiency.

For example, an implementation of a propeller blade can include a front surface, an opposing back surface, a leading end, a trailing end, and an upper end. The upper end can curve from the front surface toward the back surface. A radius of curvature of the upper end can vary along a length of the upper end.

Another implementation of a propeller blade can include a body having a front surface, an opposing back surface, a leading end, a trailing end. The propeller blade can also include a tippet curving from the body in a direction generally away from the front surface and toward the back surface. A radius of curvature of the tippet proximate the leading end can be smaller than a radius of curvature of the tippet proximate the trailing end.

In addition to the foregoing, an implementation of a propeller can include a hub and a plurality of blades extending outward from the hub. Each blade of the plurality of blades can include a front surface, an opposing back surface, a leading end, a trailing end, and an upper end. The upper end can curve in a direction generally away from the front surface and toward the back surface. A radius of curvature of the upper end at the leading end can be smaller than a radius of curvature of the upper end at the trailing end.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

One or more implementations of the present invention are directed toward improved propeller blades that reduce losses and increase efficiency. More specifically, one or more implementations of the present invention include propeller blades having a curved tippet along the top of the blade. The curved tippet can reduce force losses, redirect the radial flow in an axial direction, and otherwise increase efficiency.

Additionally, in one or more implementations, as explained in greater detail below, the curved tippet can have a radius of curvature that varies along its length. In particular, in one or more implementations, the radius of curvature of the curved tippet at the leading end of the blade can be smaller than the radius of curvature of the curved tippet at the trailing end of the blade. The variably curved tippet can draw fluid radially toward the base of the blade. The ability to draw fluid radially inward can prevent the creation of eddies off the top end of the blade, reduce the exit flow area of the propeller, and increase the inlet flow area of the propeller.

In addition to the foregoing, in one or more implementations the propeller blade can have a generally planar front surface. One will appreciate in light of the disclosure herein that a generally planar front surface differs from many conventional propeller blades that have an air foil shape. The planar shape of the front surface can prevent or reduce the formation of low or negative pressure zone across the front surface. The prevention or reduction of low or negative pressure across the front surface of the blade can help reduce or even eliminate cavitation. Furthermore, the shape of the propeller blade can reduce or eliminate bow wave impedance by using mainly the back surface of the propeller blade to push the propeller blade forward.

Figure 1:
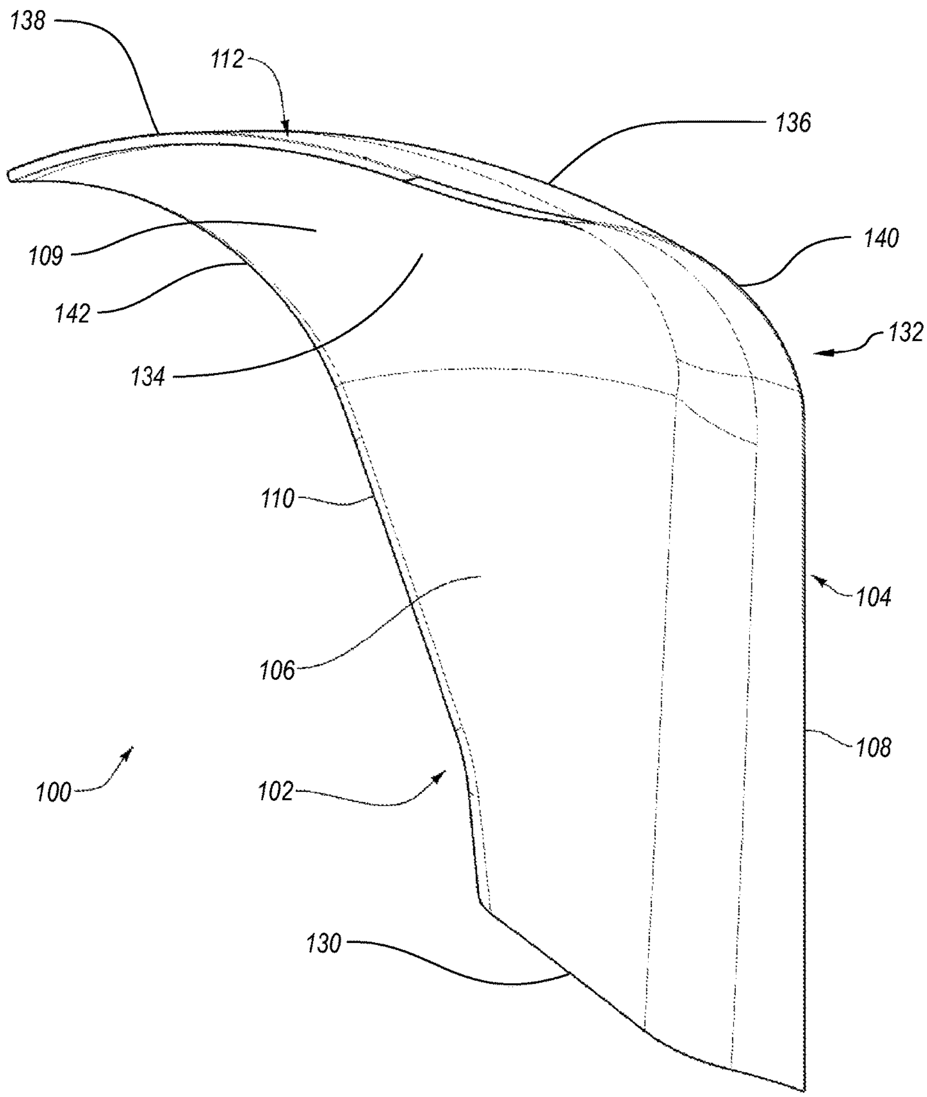
FIG. 1 illustrates a perspective view of a propeller blade in accordance with one or more implementations of the present invention.
Figure 11:
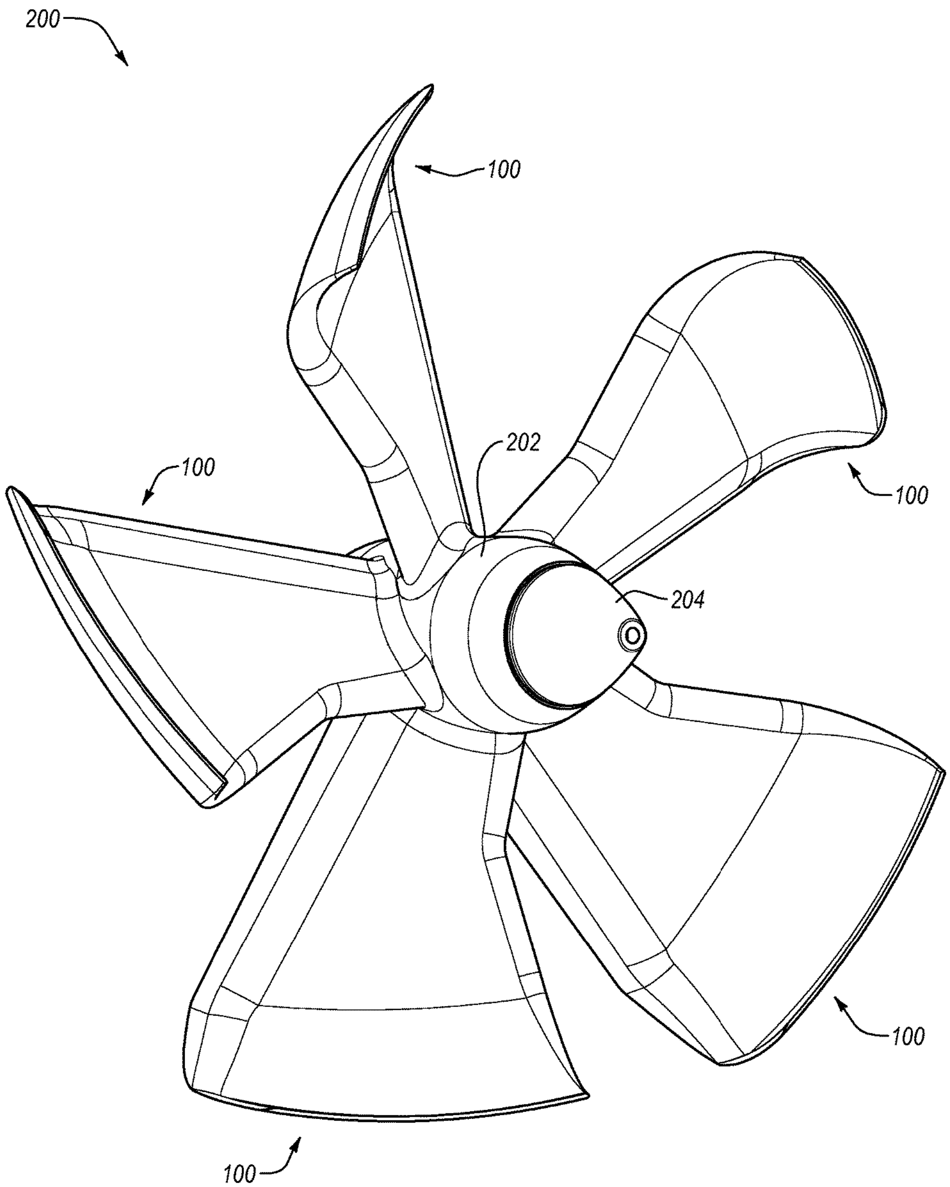
FIG. 11 illustrates a perspective view of a propeller including the propeller blade of FIG. 1 in accordance with one or more implementations of the present invention.
Figure 12:
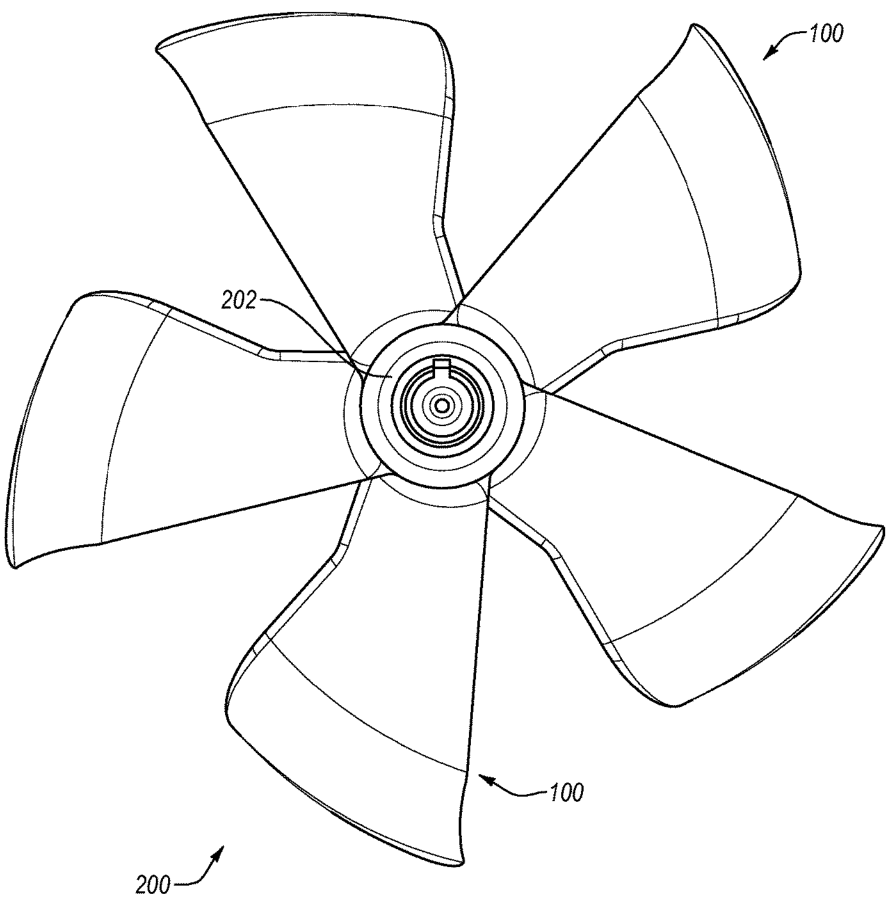
FIG. 12 illustrates a front view of the propeller of FIG. 11.
Figure 13:
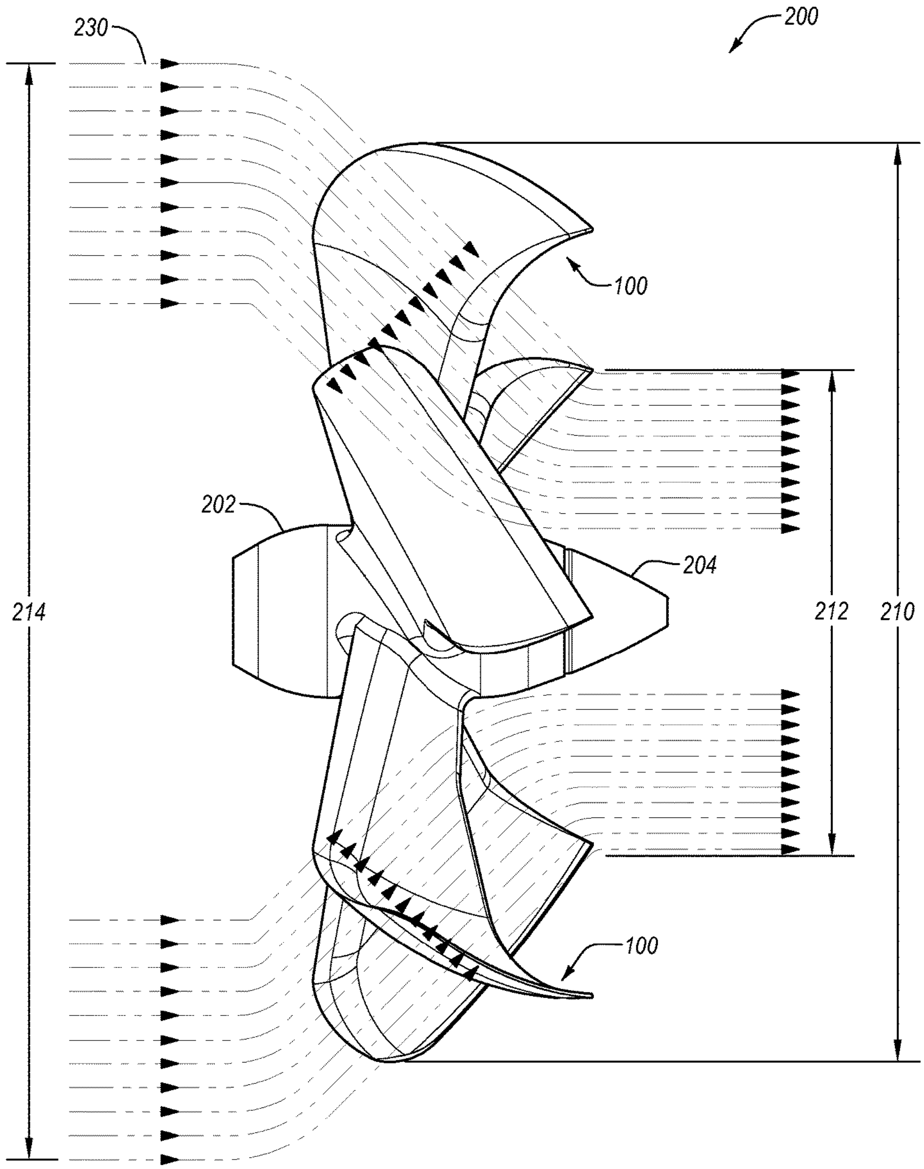
FIG. 13 illustrates a side view of the propeller of FIG. 11.

Referring now to the Figures, FIGS. 1-10 illustrate various views of a propeller blade 100 in accordance with an implementation of the present invention. As shown by FIG. 1, the propeller blade 100 can include a body 102. The body 102 can include a front surface 104, an opposing back surface 106, a leading end 108, and a trailing end 110. The body 102 can extend longitudinally between a base 130 and an upper end 132. The body 102 of the propeller blade 100 can extend generally radially outward from the hub or rotational axis of a propeller (FIGS. 11-13).

FIG. 1 further illustrates that the upper end of the body 102 can form a tippet 112 that curves generally from the front surface 104 toward the back surface 106. As used herein the term "curve" refers to a deviation from a straight line or plane surface without an abrupt turn or sharp break. In other words, the tippet 112 can gradually transition from the planar front surface that extends generally radially outward to a direction that extends substantially axially. One will appreciate that as used herein a surface that turns at an abrupt angle (i.e., 90 degrees) is not "curved." As shown in FIG. 1, the tippet 112 can include a front surface 136 and an opposing back surface 134 that respectively extend longitudinally from the front and back surfaces 104 and 106 of the body to a top end 138. The front and back surfaces 136 and 134 can each extend laterally between a leading end 140 and a trailing end 142. As shown in FIG. 1, because the tippet 112 can curve generally from the front surface 104 toward the back surface 106 of body 102, the back surface 134 of the tippet 112 can overhang the back surface 106 of the body 102 so as to form a channel 109 extending between the leading and trailing ends 140 and 142 of the tippet 112.

Figure 2:
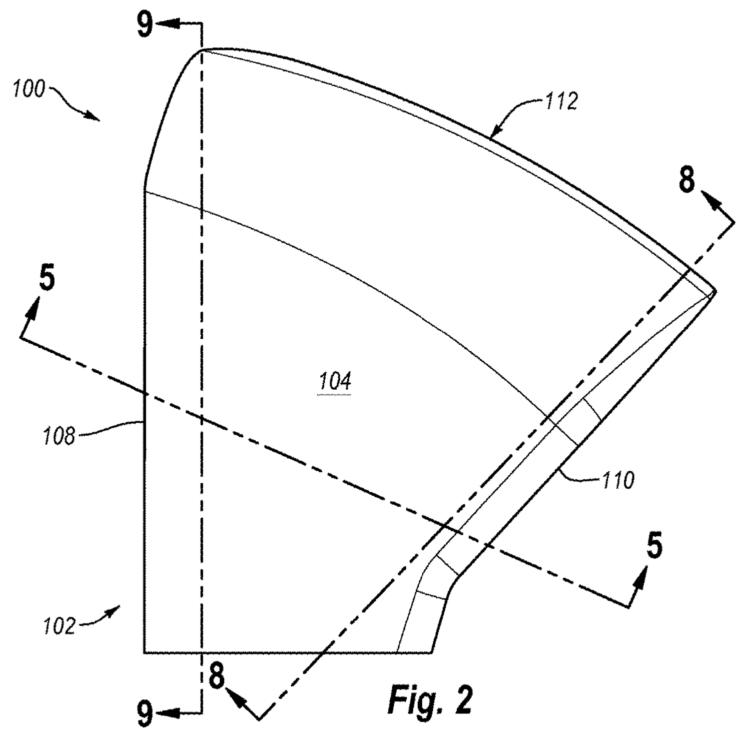
FIG. 2 illustrates a front view of the propeller blade of FIG. 1.
Figure 3:
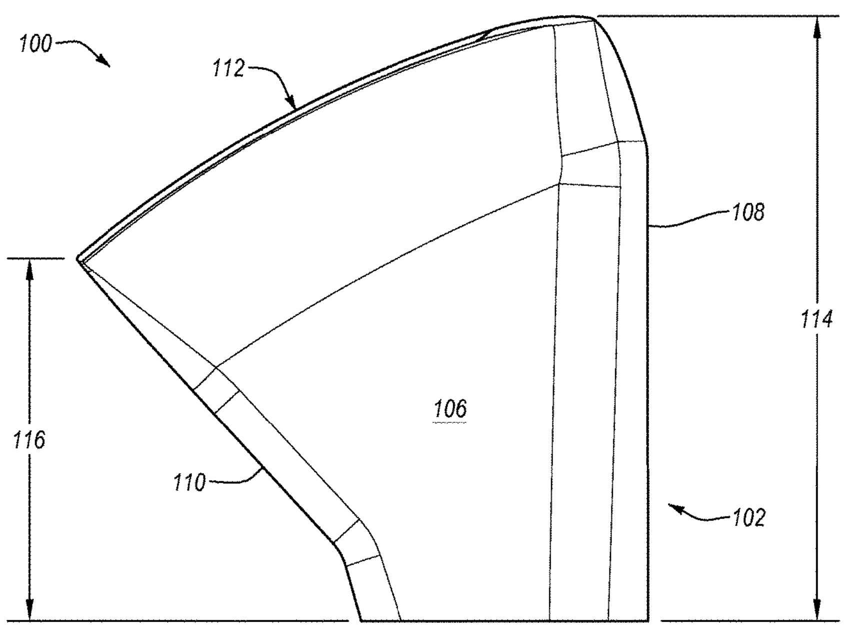
FIG. 3 illustrates a back view of the propeller blade of FIG. 1.

FIGS. 2 and 3 illustrate elevational views of the front surface 104 and back surface 106, respectively, of the blade 100. As shown by FIGS. 2 and 3, the height (i.e., distance between the base or bottom of the body 102 and the tippet 112) of the blade 100 can vary along the length (i.e., distance between the leading end 108 and trailing end 110) of the blade 100. In particular, FIG. 3 illustrates that in one or more implementations the blade 100 can have a first height 114 at, or proximate, the leading end 108. The opposite side of the blade 100 at, or proximate, the trailing end 110 can have a second height 116. As shown by FIGS. 2 and 3, in one or more implementations, the first height 114 can be larger than the second height 116. In one or more implementations, the first height 114 can be between about 1.1 times and about 3 times larger than the second height 116. In further implementations, the first height 114 can be between about 1.25 and about 1.75 times larger than the second height 116.

In alternative implementations, the first height 114 can be smaller than the second height 116, as explained in greater detail in relation to the blade 500. As explained in greater detail below, the change in height of the blade 100 along its length can help ensure that the inlet area of a propeller incorporating blades 100 is larger than the outlet area of the propeller. Additionally, as described herein below, in one or more implementations, the variable curvature of the tippet 112 can at least partially create the variance in the height of the blade 100.

Figure 4:
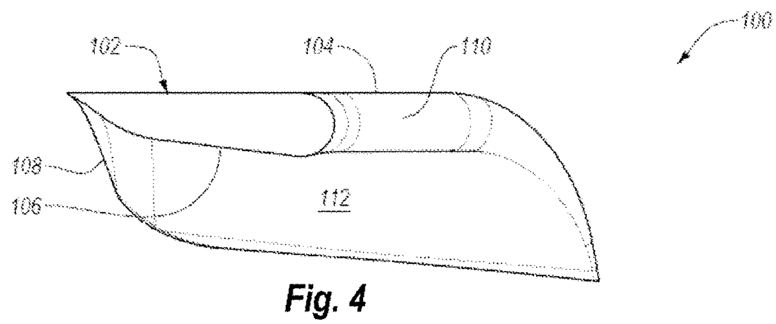
FIG. 4 illustrates a bottom view of the propeller blade of FIG. 1.
Figure 5:
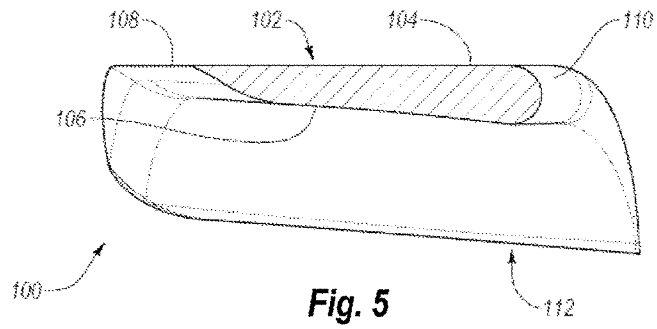
FIG. 5 illustrates a cross-sectional view of the propeller blade of FIG. 1 taken along the line 5-5 of FIG. 2.

As shown by FIGS. 4 and 5, the thickness of the body 102 of the blade 100 can vary along the length of the blade 100 between the leading end 108 and the trailing end 110. In particular, in one or more implementations, the thickness of the blade 100 can increase as the blade 100 extends from the leading end 108 to the trailing end 110. For example, FIGS. 4 and 5 illustrate that the trailing end 110 can have a thickness larger than a thickness of the leading end 108.

In one or more implementations, the thickness of the blade 100 can increase abruptly just after the leading end 108, and then gradually increase along the length of the body 102 to the trailing end 110. In alternative implementations, the thickness of the body 102 can increase proximate the leading end 108 and then remain substantially uniform along the length of the body 102 to the trailing end 110. In further implementations, the slope of the back surface 106 can be constant such that the thickness increases uniformly between the leading end 108 and the trailing end 110. In yet further implementations, the thickness of the blade 100 can be substantially uniform. Alternatively, the thickness of the blade 100 can be largest near the center of the blade 100 and decrease as the body 102 extends to the leading end 108 and the trailing end 110.

Furthermore, in one or more implementations, the leading end 108 of the blade 100 can comprise an edge. As an edge, the leading end 108 can allow the blade 100 to cut into the fluid as the blade 100 is rotated through the fluid. Additionally, in one or more implementations, as shown by FIGS. 4 and 5, the trailing end 110 can comprise a surface. In one or more implementations, the trailing end 110 can extend in a direction generally perpendicular to the front surface 104. In alternative implementations, however, the trailing end 110 can comprise an edge.

FIGS. 4 and 5 further illustrate that in one or more implementations the front surface 104 can have a substantially planar configuration. In other words, the blade 100 may not have an airfoil shape. The planar shape of the front surface 104 can prevent or reduce the formation of a low or negative pressure zone across the front surface 104, such as those produced by conventional airfoil-shaped blades. Thus, the planar configuration of the front surface 104 of the blade 100 can help reduce or even eliminate cavitation. Furthermore, the shape of the propeller blade 100 can reduce or eliminate bow wave impedance by only using the back surface 106 of the propeller blade 100 to push the propeller blade forward. Because of the planar configuration of the front surface 104, in one or more implementations, the front surface 104 is not a "suction" surface as is common with many traditional propeller blades. Indeed, in one or more implementations, the main force moving the blade 100 forward is the positive pressure on the back surface 106 of the blade 100.

As shown by FIG. 5, the blade 100 cross-sectional shape is basically an upside-down wing. Thus, the forces that are used to move a propeller with blades 100 through fluid may be mainly impingement forces rather than Bernoulli forces. One will appreciate that this is in contrast to many conventional propeller blades which are forced forward by a combination of positive pressure acting on the back side of the blade and negative pressure on the front side of the blade.

Figure 6:
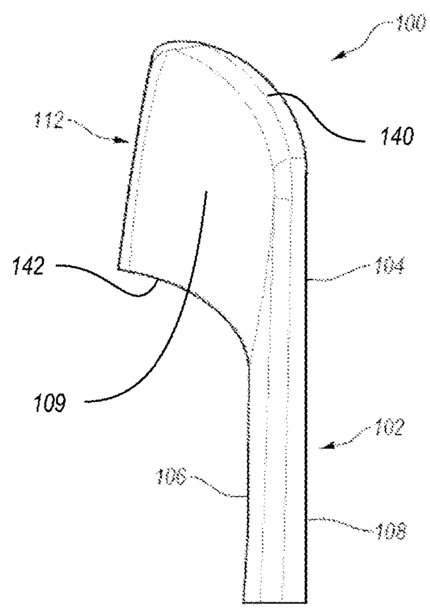
FIG. 6 illustrates a view of the leading end of the propeller blade of FIG. 1.
Figure 7:
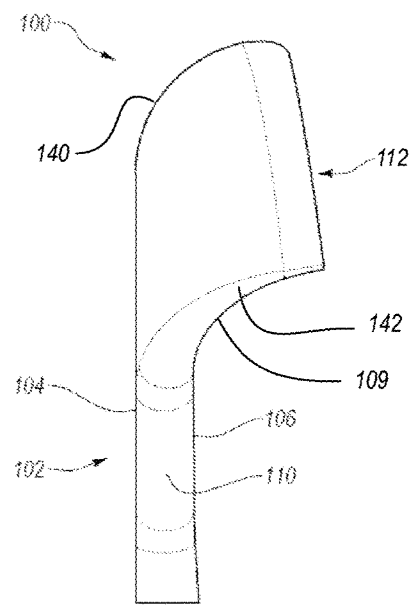
FIG. 7 illustrates a view of the trailing end of the propeller blade of FIG. 1.
Figure 8:
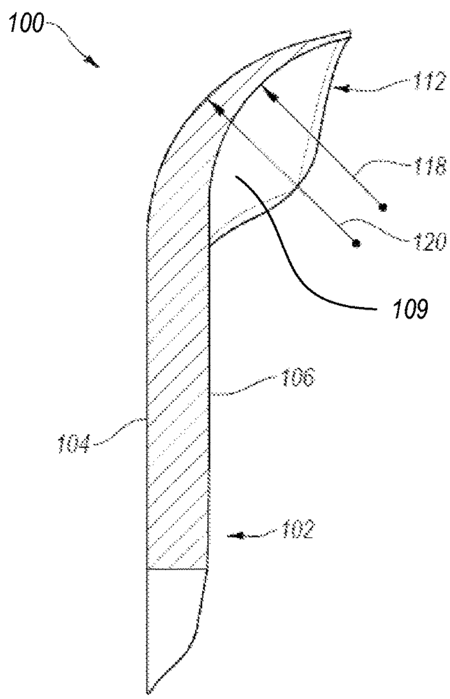
FIG. 8 illustrates a cross-sectional view of the propeller blade of FIG. 1 taken along the line 8-8 of FIG. 2.
Figure 9:
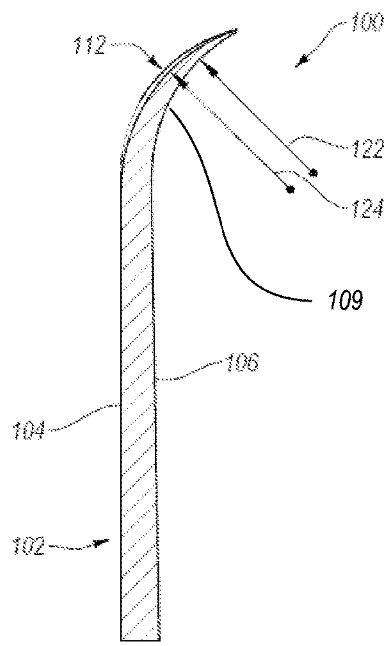
FIG. 9 illustrates a cross-sectional view of the propeller blade of FIG. 1 taken along the line 9-9 of FIG. 2.

As mentioned previously, the blade 100 can include a tippet 112. FIGS. 6 and 7 illustrate end views of the blade 100, while FIGS. 8 and 9 illustrate cross-sectional views of the blade 100. Each of FIGS. 6-9 show that the upper end or tippet 112 of the blade 100 can extend generally away from the body 102 in a direction backward and away from the back surface 106. Or in other words, the tippet 112 can extend in a direction generally away from the front surface 104 and toward the back surface 106. Thus, as discussed above, the tippet 112 can curve from the front surface 104 toward, and beyond, the back surface 106 so as to form a channel 109 extending between the leading and trailing ends 140 and 142 of the tippet 112.

In one or more implementations of the present invention, the radius of curvature of the tippet 112 can vary along the length of the tippet 112. For example, FIGS. 8 and 9 show that the radius of curvature 122 at, or proximate, the leading end 108 can be smaller than the radius of curvature 118 of the tippet 112 at, or proximate, the trailing end 110. Thus, as shown best by FIGS. 6 and 7, the radius of curvature of the tippet 112 can decrease from the leading end 108 as it extends along the body 102 to the trailing end 110. For instance, in some implementations the radius of curvature 122 of the tippet 112 at the leading end 108 can be between about 1.1 and about 6 times smaller than the radius of curvature 118 of the tippet 112 at the trailing end 110. Suitably, the radius of curvature 122 of the tippet 112 at the trailing end 110 can be larger than the radius of curvature 118 of the tippet 112 at the leading end 108 by a factor of about 1.25.

FIGS. 8 and 9 further illustrate that the thickness of the tippet 112 can vary as the tippet 112 extends away from the body 102. For example, the thickness of the tippet 112 can decrease as the tippet 102 extends away from the front surface 104 of the body 102 of the blade 100. One will appreciate in light of the disclosure herein that the variable thickness of the tippet 112 can cause the radius of curvature 124 of the front side of the tippet 112 proximate the leading end 108 to be larger than the radius of curvature 122 of the back side of the tippet 112 proximate the leading end 108. Similarly, the radius of curvature 120 of the front side of the tippet 112 proximate the trailing end 110 can be larger than the radius of curvature 118 of the back side of the tippet 112 proximate the trailing end 110.

Figure 10:
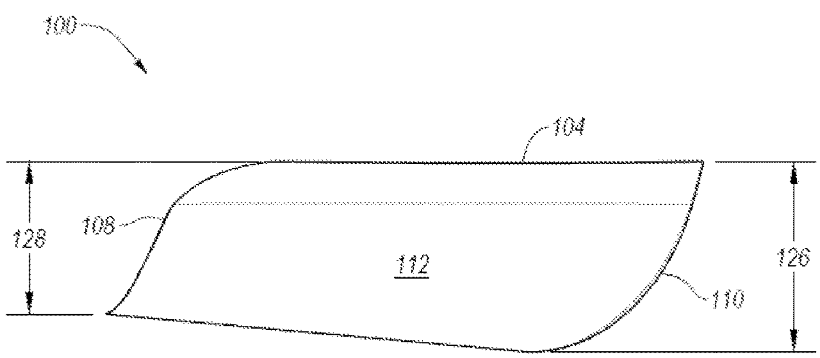
FIG. 10 illustrates a top view of the propeller blade of FIG. 1.

As illustrated by FIG. 10, the tippet 112 can extend a distance from the front surface 104. In one or more implementations of the present invention, the distance the tippet 112 extends from the front surface 104 can vary along the length of the tippet 112. The variance in distance the tippet 112 extends from the front surface 104 can be due in part to the variable curvature of the tippet 112. For example, FIG. 10 illustrates that a distance 128 the tippet 112 extends away from the front surface 104 proximate the leading end 108 is less than a distance 126 the tippet 112 extends away from the front surface 104 proximate the trailing end 110. In any event, the average distance the tippet 112 extends from the front surface 104 can be between about $1/16^{th}$ and about ½ of the height 114 (FIG. 3) of the blade 100 at leading end 108. Suitably, the tippet 112 can extend a distance of between about $1/4^{th}$ and about $1/3^{rd}$ or less of the height 114 of the blade 100 at the leading end 108.

One will appreciate in light of the disclosure herein that the shape and various curvatures of the tippet 112 can provide various unexpected results. For example, the tippet 112 can capture radial flow (i.e., fluid moving across the front or back surfaces 104, 106) and redirect it in an axial direction (i.e., in a direction generally parallel to an axis of rotation of the blade 100). The ability of the tippet 112 to capture radial flow and redirect it in an axial direction can prevent the creation of eddies off of the upper end of the blade 100. Thus, in one or more implementations, the tippet 112 can prevent the blade 100 from causing fluid to flow radially outward of the upper end of the blade 100. The reduction or prevention of the formation of eddies off of the upper end of the blade 100 can lead to increased efficiency and a reduction in noise created by the blade 100. Furthermore, the ability to prevent fluid from flowing outward of the outer radius of the blade 100 can prevent the pushing of fluid against a conduit when the blade 100 is used as part of a pump. This can prevent damage to blood when the blade 100 is used as part of a blood pump.

In one or more implementations of the present invention, the tippet 112 is configured to be angled or non-parallel relative to the axis of rotation of the blade 100. In other words, the tippet 112 can extend in a direction that is at an angle or non parallel to a cylinder that is concentric to the axis of rotation of the blade 100. One will appreciate that a designer may ensure the tippet 112 is non parallel to the axis of rotation of the blade 100 because a force directed at the center of the blade may not move the fluid backwards. Because it is desirable that the fluid be forced backwards so the reaction force moves the blade forward, by ensuring the tippet 112 is non parallel to the axis of rotation, the designer can help ensure blade 100 will move fluid.

Thus, the blade 100 can allow for a more efficient use of the energy coming from the rotating drive shaft. The tippets 112 can redirect the radial fluid flow to a more axial flow direction. This redirection of the radial flow adds to the forces available to move the blade 100 forward, thereby increasing the efficiency of the propeller blades 100. Furthermore, the tippets 112 can funnel fluid to the axis of rotation of the blade 100, and thus, speed up the fluid as it passes by the blade 100.

Referring now to FIGS. 11-13, a propeller 200 is shown having five blades 100 secured to a hub 202. One will appreciate that the propeller 200 can be configured to rotate about the axis of the hub 202. The propeller 200 is configured as an inboard propeller for a boat. As shown by the Figures, each blade 100 of the propeller 200 can have a relatively high pitch to allow for increased speed, and thus, increased fluid flow through the propeller 200. One will appreciate that a designer/engineer can modify the number, size, and the pitch of the blades 100 for a particular use/application.

As mentioned previously, each blade 100 can have a configuration to provide the propeller 200 with a larger flow inlet area than flow outlet area. For example, FIG. 13 illustrates that the propeller 200 can have a flow outlet diameter 212 (and corresponding outlet area) that is smaller than the flow inlet diameter 210 (and corresponding inlet area). The change in inlet diameter versus outlet diameter can be due in part to the pitch of the blades 100 and variable height of each blade 100.

One will appreciate in light of the disclosure herein that when fluid is accelerated, the flow area needed to contain this flow is reduced by the inverse of the speed change of the fluid in that direction. The reduced fluid exit diameter 212 (and corresponding exit area) of the propeller 200 can further increase the force on the propeller 200, and thus, the efficiency of the propeller 200. Thus, the tippets 112 on the outer end of the blades 100 can function like a conduit area reduction in a pump. In particular, the tippets 112 can contain the fluid stream from expanding outward as it passes through the propeller 200, adding to the total axial forces, and thereby, increasing the power and efficiency of the propeller 200.

Furthermore, as previously mentioned, the tippets 112 can draw fluid that is radially outward of the inlet diameter 210 of the propeller 200 radially inward toward the axis of rotation of the propeller 200. The ability of the tippet 112 to draw fluid 230 inward from beyond the radially outermost portion of the blade 100 can increase the effective inlet diameter of the propeller 200. For example, FIG. 13 illustrates that the propeller 200 can have an effective inlet diameter 214 (and associated effective inlet area) that is larger than the physical inlet diameter 210 (and associated inlet area). In one or more implementations, the effective inlet diameter 214 can be between about 1.10 and about 2 times as large as the inlet diameter 210. In yet further implementations, the effective inlet diameter 214 can be between about 1.25 and about 1.50 times as large as the inlet diameter 210.

The effective inlet diameter 214 (and associated effective inlet area) can create an even larger difference between the inlet and outlet areas of the propeller 200. This difference in the inlet and outlet areas of the propeller 200 can further increase the speed of the fluid flowing out of the propeller compared to the speed of the fluid flowing into the propeller 200. Thus, the blades 100 can further increase the thrust and efficiency of the propeller 200.

FIGS. 11 and 13 further illustrate that propeller 200 can include a cone 204 extending backward off of the rear of the hub 202. The cone 204 can serve to further decrease the flow outlet diameter 212. In particular, the cone 204 can push the innermost layer of fluid radially outward. The additional decrease in the flow outlet diameter 212 can further increase the exit flow velocity, and thus, the efficiency of the propeller 200.

One will appreciate in light of the disclosure herein that a blade including the various features described herein above can take various forms. Thus, implementations of the present invention are not limited to the particular blades or propellers illustrated in the Figures. For example, FIGS. 1-13 illustrate blades 100 having a height (i.e., distance between the base of the body 102 and the tippet 112) that is larger than the length (i.e., distance between the leading end 108 and trailing end 110). The present invention, however, is not so limited. For example, FIGS. 14-18 illustrates various view of another propeller blade 300 having a length that is larger than the height.

Figure 14:
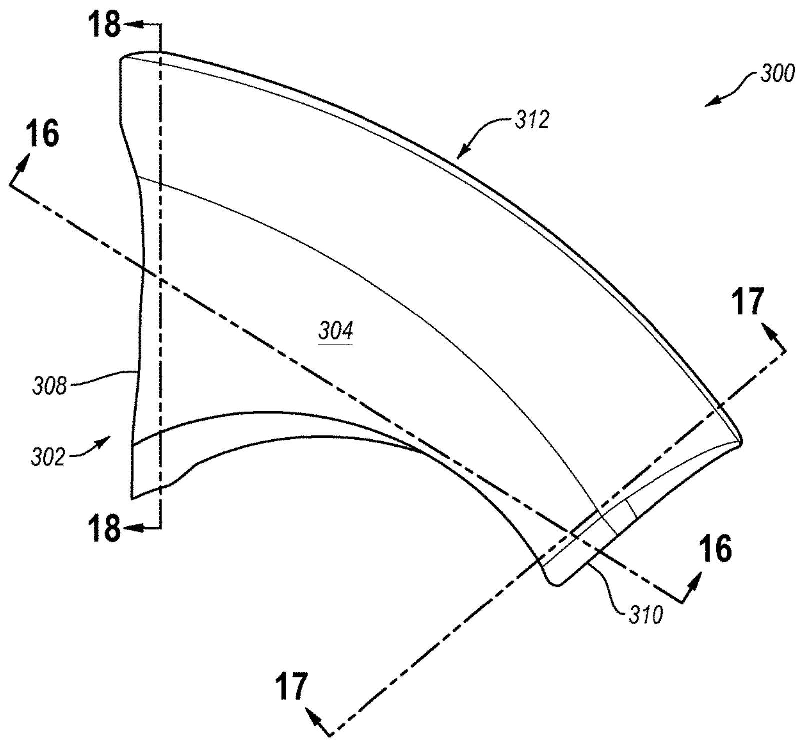
FIG. 14 illustrates a front view of another propeller blade in accordance with one or more implementations of the present invention.
Figure 15:
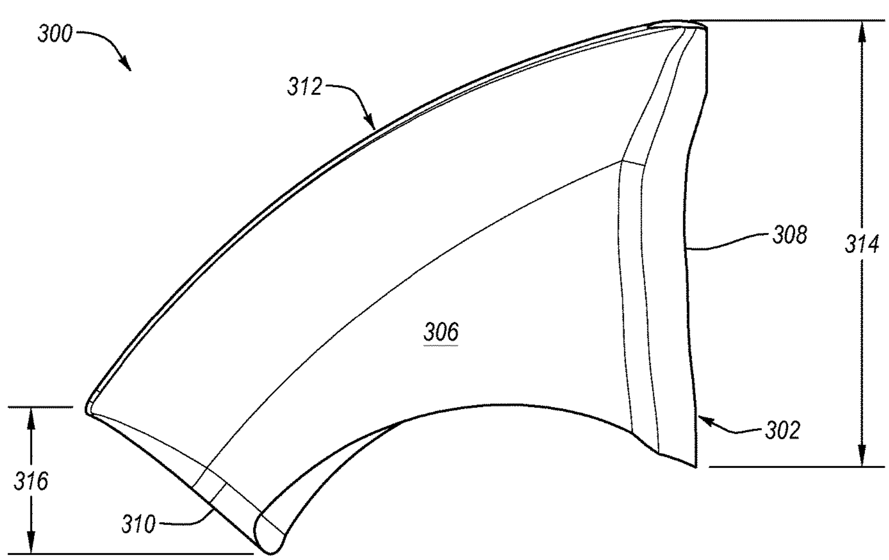
FIG. 15 illustrates a back view of the propeller blade of FIG. 14.

Similar to the blade 100, FIGS. 14 and 15 illustrate that the blade 300 can include a body 302. The body 302 can include a front surface 304, an opposing back surface 306, a leading end 308, and a trailing end 310. Furthermore, the blade 300 can include an upper end or tippet 312 that curves generally from the front surface 304 toward the back surface 306.

As shown by FIGS. 14 and 15, the height of the blade 300 can vary along the length of the blade 300. In particular, FIG. 15 illustrates that in one or more implementations the blade 300 can have a first height 314 at, or proximate, the leading end 308 that is greater than a second height 316 at, or proximate, the trailing end 310. This difference in blade height can contribute to a difference in fluid flow inlet area and fluid flow outlet area.

Figure 16:
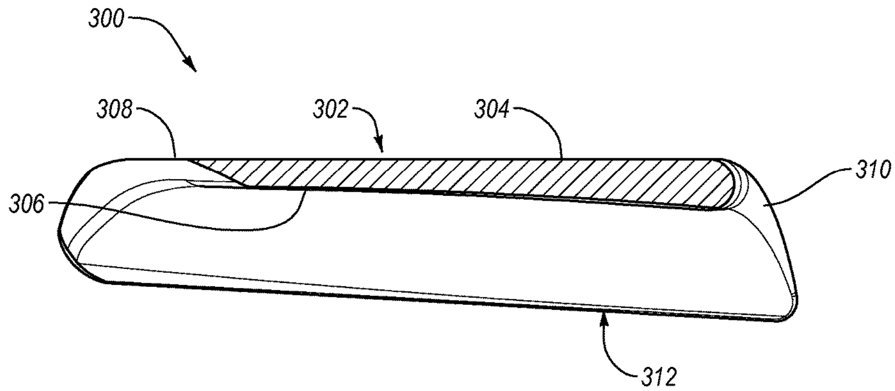
FIG. 16 illustrates a cross-sectional view of the propeller blade of FIG. 14 taken along the line 16-16 of FIG. 14.

FIG. 16 illustrates that the thickness of the body 302 of the blade 300 can vary along the length of the blade 300 between the leading end 308 and the trailing end 310. In particular, in one or more implementations, the thickness of the blade 300 can increase as the blade 300 extends from the leading end 308 to the trailing end 310. For example, FIG. 16 illustrates that the trailing end 310 can have a greater thickness than a thickness of the leading end 308. In one or more implementations, the leading end 308 of the blade 300 can comprise an edge. As an edge, the leading end 308 can allow the blade 300 to cut into fluid as the blade 300 is rotated through the fluid. Additionally, in one or more implementations, as shown by FIG. 16, the trailing end 310 can comprise a surface. The blade 300 can also include a substantially planar front surface 304, as shown by FIG. 16.

Figure 17:
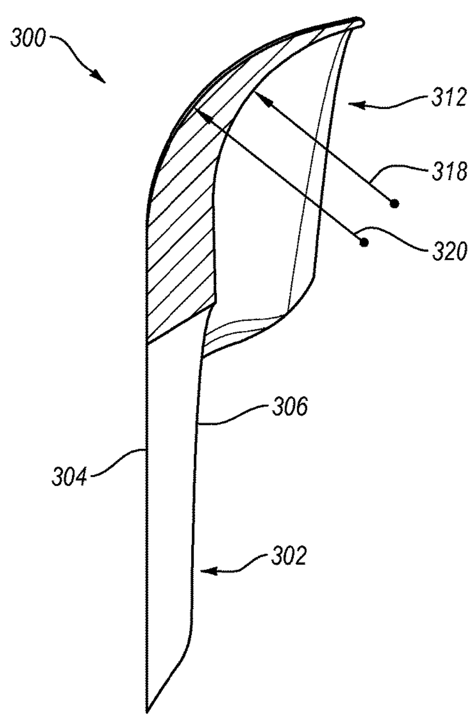
FIG. 17 illustrates a cross-sectional view of the propeller blade of FIG. 14 taken along the line 17-17 of FIG. 14.
Figure 18:
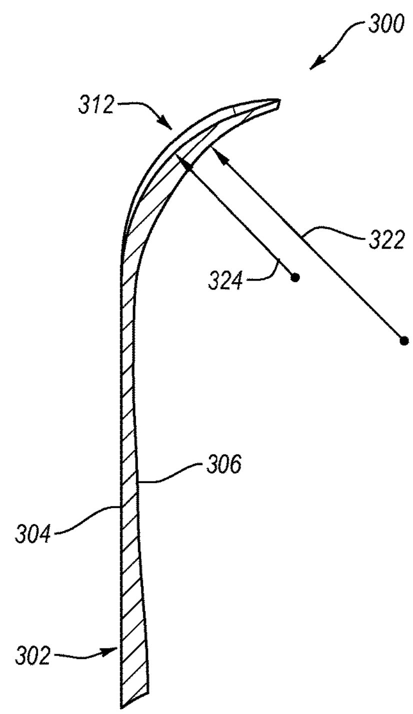
FIG. 18 illustrates a cross-sectional view of the propeller blade of FIG. 14 taken along the line 18-18 of FIG. 14.

Similar to the blade 100, the tippet 312 of blade 300 can vary along its length. For example, FIGS. 17 and 18 show that the radius of curvature 322 at, or proximate, the leading end 308 can be smaller than the radius of curvature 318 of the tippet 312 at, or proximate, the trailing end 310. Thus, the radius of curvature of the tippet 312 can decrease from the leading end 308 as it extends along the body 302 to the trailing end 310.

FIGS. 17 and 18 further illustrate that the thickness of the tippet 312 can vary as the tippet 312 extends away from the body 302. For example, the thickness of the tippet 312 can decrease as the tippet 302 extends away from the front surface 304 of the body 302 of the blade 300. One will appreciate in light of the disclosure herein that the variable thickness of the tippet 312 can cause the radius of curvature 324 of the front side of the tippet 312 proximate the leading end 308 to be larger than the radius of curvature 322 of the back side of the tippet 312 proximate the leading end 308. Similarly, the radius of curvature 320 of the front side of the tippet 312 proximate the trailing end 310 can be larger than the radius of curvature 318 of the back side of the tippet 312 proximate the trailing end 310.

Figure 19:
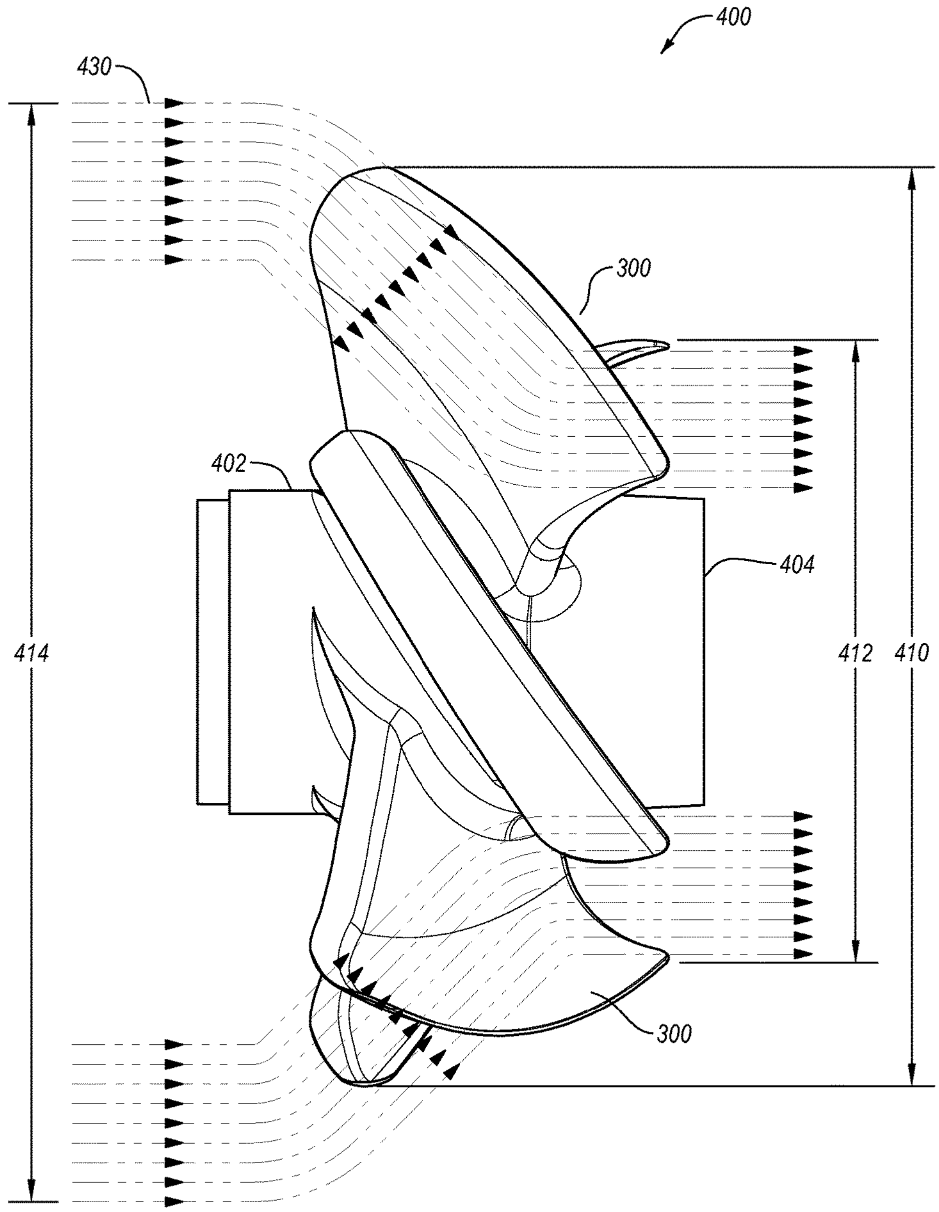
FIG. 19 illustrates a side view of a propeller including the propeller blade of FIG. 14 in accordance with one or more implementations of the present invention.

Referring now to FIG. 19, a propeller 400 is shown having five blades 300 secured to a hub 402. One will appreciate that the propeller 400 can be configured to rotate about the axis of the hub 402. The propeller 400 is configured as an outboard propeller for a boat. As mentioned previously, each blade 300 can have a configuration to provide the propeller 400 with a flow inlet area than is larger than the flow outlet area. For example, FIG. 19 illustrates that the propeller 400 can have a flow outlet diameter 412 (and corresponding outlet area) that is smaller than the flow inlet diameter 410 (and corresponding inlet area). The change in inlet diameter versus outlet diameter is created at least in part by the pitch of the blades 300 and the variable height 314, 316 of each blade 300.

Similar to the tippets 112, the tippets 312 can draw fluid that is radially outward of the inlet diameter 410 of the propeller 400 radially inward toward the axis of rotation of the propeller 400. The ability of the tippets 312 to draw fluid 430 inward from beyond the radially outermost portion of the blades 300 can increase the effective inlet diameter of the propeller 400. For example, FIG. 19 illustrates that the propeller 400 can have an effective inlet diameter 414 (and associated effective inlet area) that is larger than the actual inlet diameter 410 (and associated inlet area). Thus, the tippets 312 of the blades 300 can further increase the efficiency of the propeller 400.

Figure 20:
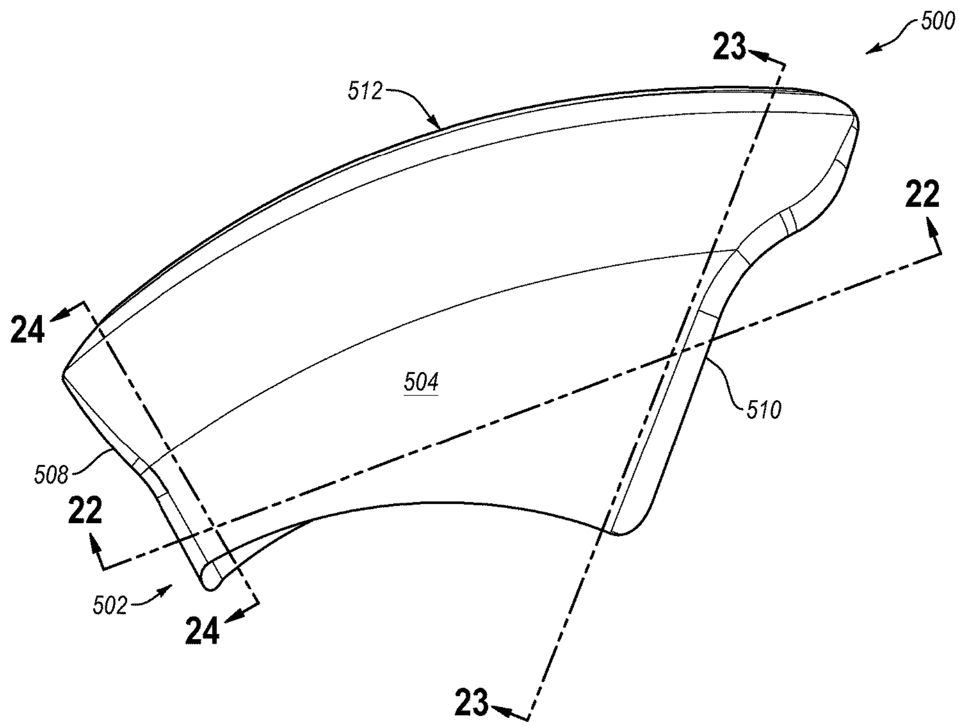
FIG. 20 illustrates a front view of yet another propeller blade in accordance with one or more implementations of the present invention.
Figure 21:
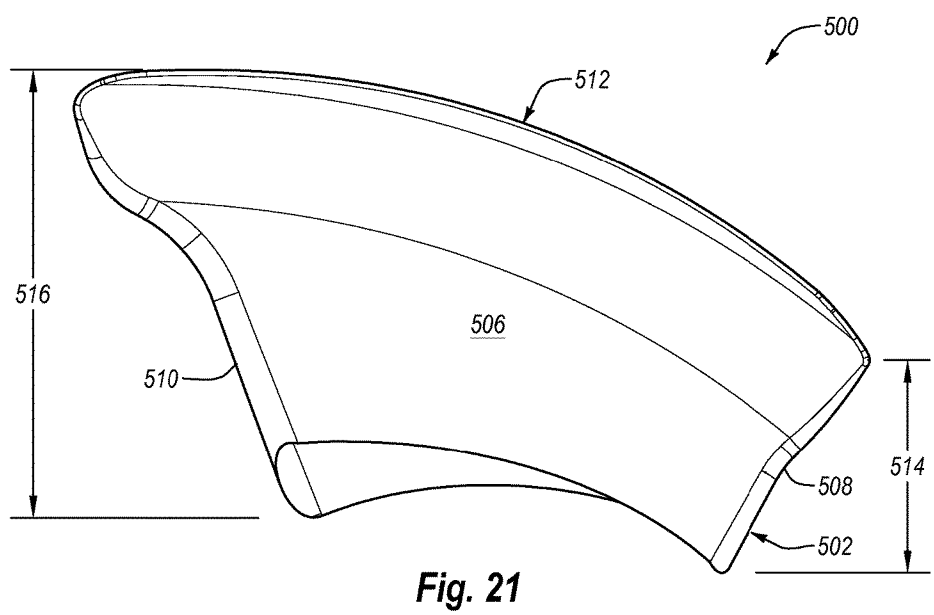
FIG. 21 illustrates a back view of the propeller blade of FIG. 20.

In addition to varying the height to length ratio of the blade, implementations of the present invention include other changes and design modifications. For example, FIGS. 20-24 illustrate various views of yet another propeller blade 500 illustrating yet additional variations relative to the previous shown and described propeller blades 100, 300. Similar to the blades 100, 300, FIGS. 20 and 21 illustrate that the blade 500 can include a body 502. The body 502 can include a front surface 504, an opposing back surface 506, a leading end 508, and a trailing end 510. Furthermore, the blade 500 can include a tippet 512 that curves generally from the front surface 504 toward the back surface 506.

As shown by FIGS. 20 and 21, the height of the blade 500 can vary along the length of the blade 500. In particular, FIG. 21 illustrates that in one or more implementations the blade 500 can have a first height 514 at, or proximate, the leading end 508 that is smaller than a second height 516 at, or proximate, the trailing end 510. One will appreciate that this is in contrast to the heights of the blades 100, 300 described herein above. This difference in blade height can contribute to a difference in fluid flow inlet area and fluid flow outlet area, as described herein below.

Figure 22:
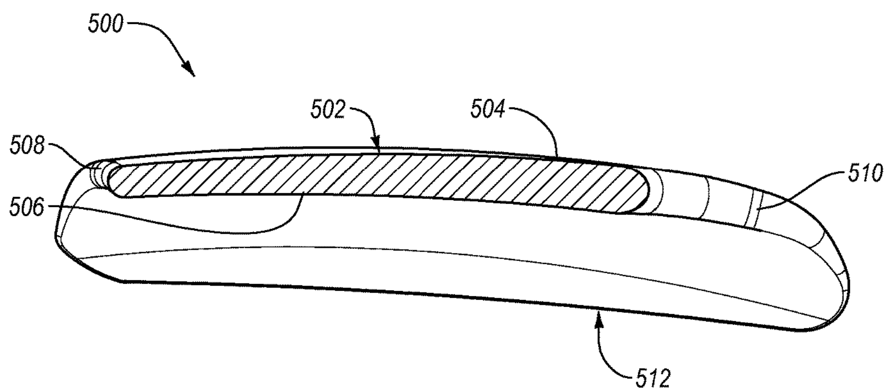
FIG. 22 illustrates a cross-sectional view of the propeller blade of FIG. 20 taken along the line 22-22 of FIG. 20.

FIG. 22 illustrates that the thickness of the body 502 of the blade 500 can vary along the length of the blade 500 between the leading end 508 and the trailing end 510. In particular, in one or more implementations, the thickness of the blade 500 can increase as the blade 500 extends from the leading end 508 to the trailing end 510. For example, FIG. 22 illustrates that the trailing end 510 can have a greater thickness than a thickness of the leading end 508. As shown by FIG. 22, the leading end 508 can comprise a surface that curves from the front surface 504 to the back surface 506. Similarly, the trailing end 510 can comprise a surface that curves from the front surface 504 to the back surface 506.

FIG. 22 further illustrates that the blade 500 can also include a substantially planar front surface 504. More particularly, FIG. 22 illustrates that the front surface 504 can include a small amount of curvature. This is in contrast to the front surfaces 104, 304 described above that include substantially no curvature.

Figure 23:
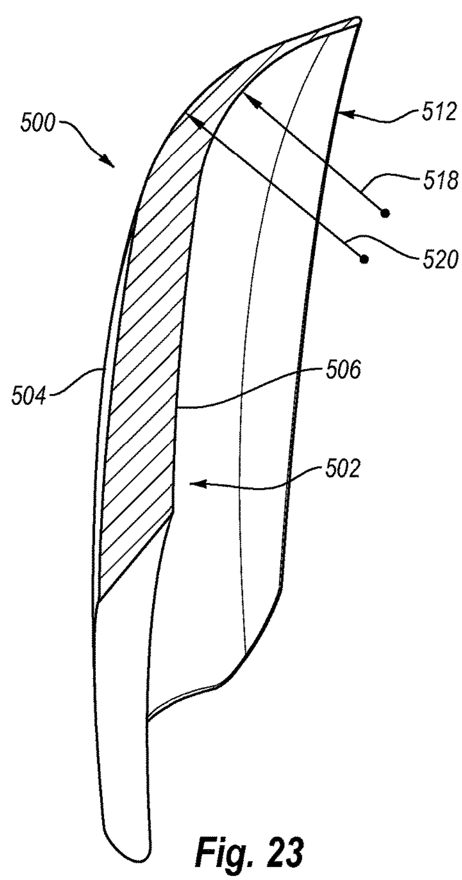
FIG. 23 illustrates a cross-sectional view of the propeller blade of FIG. 20 taken along the line 23-23 of FIG. 20.
Figure 24:
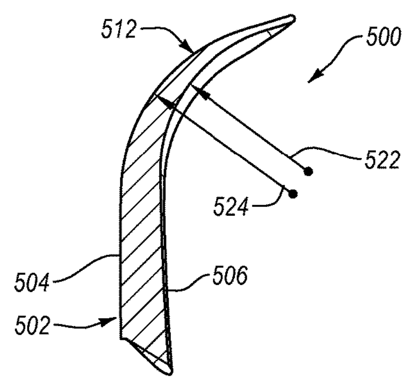
FIG. 24 illustrates a cross-sectional view of the propeller blade of FIG. 20 taken along the line 24-24 of FIG. 20.

Similar to the blade 100, the tippet 512 of blade 500 can vary along its length. For example, FIGS. 23 and 24 show that the radius of curvature 522 at, or proximate, the leading end 508 can be smaller than the radius of curvature 518 of the tippet 512 at, or proximate, the trailing end 510. Thus, the radius of curvature of the tippet 512 can decrease from the leading end 508 as it extends along the body 502 to the trailing end 510.

FIGS. 23 and 24 further illustrate that the thickness of the tippet 512 can vary as the tippet 512 extends away from the body 502. For example, the thickness of the tippet 512 can decrease as the tippet 502 extends away from the front surface 504 of the body 502 of the blade 500. One will appreciate in light of the disclosure herein that the variable thickness of the tippet 512 can cause the radius of curvature 524 of the front side of the tippet 512 proximate the leading end 508 to be larger than the radius of curvature 522 of the back side of the tippet 512 proximate the leading end 508. Similarly, the radius of curvature 520 of the front side of the tippet 512 proximate the trailing end 510 can be larger than the radius of curvature 518 of the back side of the tippet 512 proximate the trailing end 510.

Figure 25:
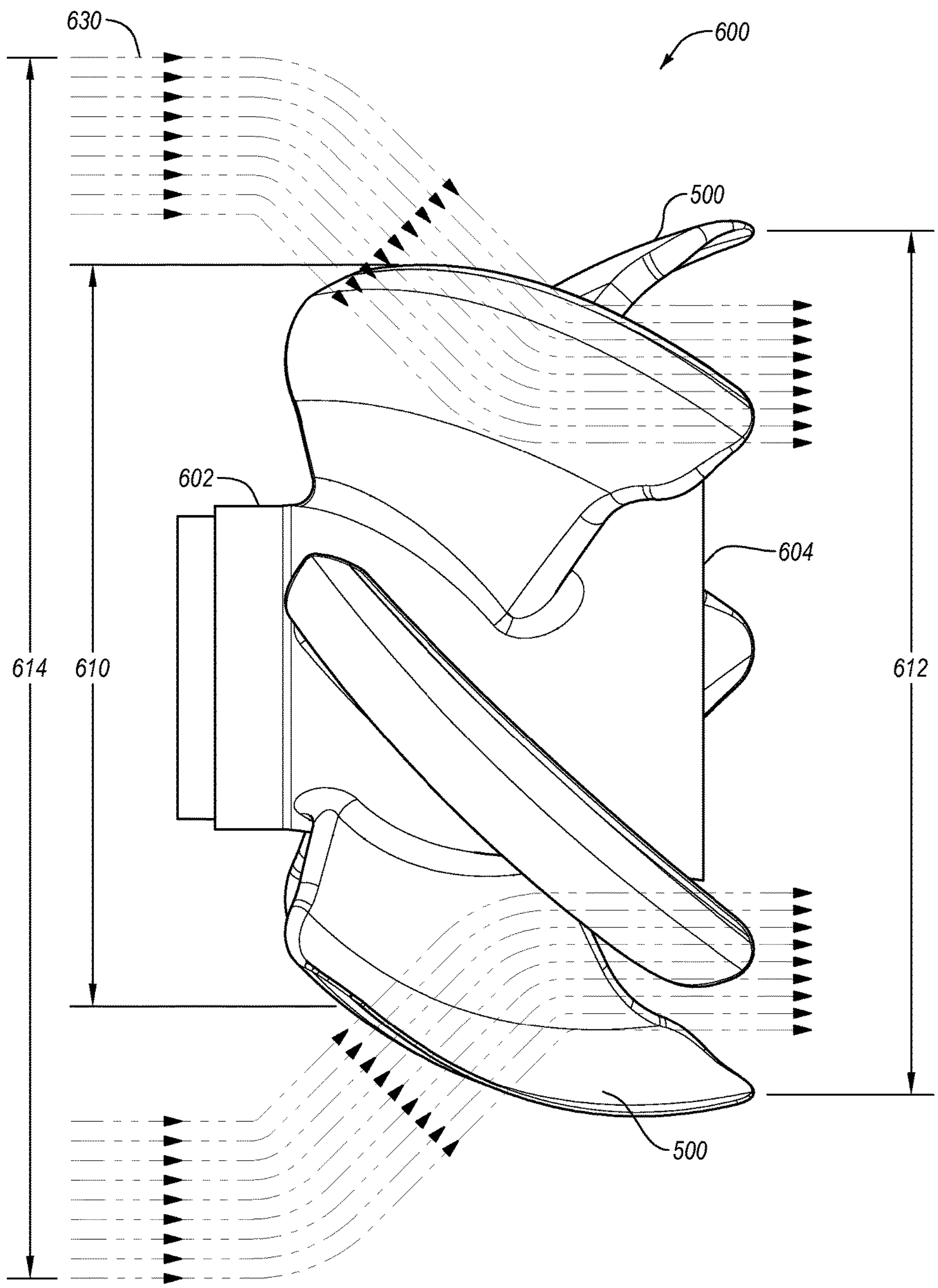
FIG. 25 illustrates a side view of a propeller including the propeller blade of FIG. 14 in accordance with one or more implementations of the present invention.

Referring now to FIG. 25, a propeller 600 is shown having five blades 500 secured to a hub 502. One will appreciate that the propeller 600 can be configured to rotate about the axis of the hub 602. The propeller 600 is configured as an outboard propeller for a boat.

As shown by FIG. 25, each blade 500 can have a configuration to provide the propeller 600 with a flow inlet area than is smaller than the flow outlet area. For example, FIG. 25 illustrates that the propeller 600 can have a flow outlet diameter 612 (and corresponding outlet area) that is larger than the flow inlet diameter 610 (and corresponding inlet area). The change in inlet diameter versus outlet diameter is created at least in part by the change in height 514, 516 of each blade 500.

Similar to the tippets 112, the tippets 512 can draw fluid that is radially outward of the inlet diameter 610 of the propeller 600 radially inward toward the axis of rotation of the propeller 600. The ability of the tippets 512 to draw fluid 630 inward from beyond the radially outermost portion of the blades 500 can provide an effective inlet diameter 614. For example, FIG. 25 illustrates that the propeller 600 can have an effective inlet diameter 614 (and associated effective inlet area) that is larger than the physical inlet diameter 610 (and associated inlet area) and the flow outlet diameter 612 (and corresponding outlet area). Thus, the tippets 512 of the blades 500 can provide an effective flow inlet area that is larger than the flow outlet area, despite that fact that the physical inlet area is smaller than the flow outlet area. Thus, the propeller 600 can cause the fluid exiting from behind the propeller 600 to move at a faster speed than the fluid entering the front of the propeller 600, even with a physical inlet area that is smaller than the outlet area.

As previously mentioned, the effective flow inlet areas of one or more implementations can be larger than the flow outlet areas. In particular, in one or more implementations the effective flow inlet area of a propeller can be between about 1.25 and about 3 times the size of the flow outlet area. Suitably, the effective flow inlet area of a propeller can be between about 1.5 and about 2 times the size of the flow outlet area.

The combination of the unique features and shape of the blades 100, 300, 500 can produce unexpected results. For example, a boat with a 120 horsepower motor and a conventional propeller with a 14 inch flow inlet diameter was tested. At 2000 revolutions per minute the conventional 14 inch propeller drove the boat at about 11.2 miles per hour. As the boat was propelled forward from a stand still, the back of the boat dropped lower into the water. Additionally, the conventional propeller produced a significant a rooster tail above the surface of the water. The boat planned out at about 2500 revolutions per minute and a speed of 17 miles per hour.

The conventional propeller was replaced with a propeller similar to the propeller 200 with a 14 inch flow inlet diameter, and the boat was again tested. At 2000 revolutions per minute the propeller 400 drove the boat at 19 miles per hour. In other words, the propeller 200 with blades 100 provided 1.70 times the speed while using the same motor power. As the boat started from a stand still, the back of the boat did not drop noticeably lower in the water. Additionally, virtually no rooster tail was produced above the surface of the water. Instead, a submerged accelerated water column was produced by the propeller 200 moving the water straight backwards instead of backwards and radially outward.

Another test was performed using a propeller similar to the propeller 400 with a 14 inch flow inlet diameter. As the boat started from a stand still, the back of the boat did not drop noticeably lower in the water. Additionally, virtually no rooster tail was produced above the surface of the water. Instead, a submerged accelerated water column was produced by the propeller 400 moving the water straight backwards instead of backwards and radially outward. Furthermore, the boat planned out at a much quicker at 1900 revolutions per minute and a speed of 11 miles per hour.

The unexpected power and efficiency of the propellers 200, 400, 600 can be due in part to the manner in which the blades 100, 300, 500 move fluid about the propeller. When fluid passes through a propeller with standard or conventional blades, the two forces that act on the fluid are the centrifugal force of the rotating fluid, and the velocity pressure of the fluid, and these two forces are perpendicular to each other. The fluid must take a path that is moving away from the center of the rotating propeller as the vector addition of these two forces is away from the center of rotation.

In contrast, when fluid passes through a propeller with blades 100, 300, 500, the fluid is directed toward the center of the propeller, and then passes through the propeller. As explained above, this is at least in part due to the fact that the tippets redirect the radial fluid flow to a more axial flow direction. This redirection of the radial flow increases the forces that move propeller forward, thereby increasing the efficiency of the propeller.

Furthermore, by directing radial fluid flow in an axial direction and by drawing the fluid toward the center of the propeller, the blades 100, 300, 500 also reduce fluid being forced radially beyond the ends of the blades 100, 300, 500. The absence of a rooster tail behind the boat in the experiment was due to this redirection of radial fluid flow. One will appreciate that by reducing the flow of fluid radially outward, blades 100, 300, 500 of the present invention can increase efficiency by preventing or reducing losses due to fluid being projected against the wall of a pump conduit. Additionally, the shape of the blades 100, 300, 500 reduce cavitation and bow wave impedance by having the forces acting on the back surface of the blades 100, 300, 500 push the propeller forward.

One will appreciate that an engineer/designer can employ the propeller blades of the present invention in various different applications to increase efficiency and reduce losses. For example, depending upon the application the engineer/designer can adjust the blade size and pitch. For instance, blades of the present invention can be employed with a blood pump. Such a blood pump can provide various advantages over conventional blood pump rotors. For example, the reduction in power required due to the increased efficiency provided by the blades can increase the useable lifetime of the rotor and associated blood pump by increasing the time before any power source in the blood pump needs replacement. Also, the redirection of radial fluid flow about the blades 100, 300, 500 can reduce damage to the blood cells common with conventional blood pumps by preventing the blood cells from being forced against vessel walls.

Furthermore the increased efficiency of the blades 100, 300, 500 can allow the rotor and associated blood pump to more closely mimic a human heart. For example, conventional blood pumps about 4 liters at a pressure of about 90 millimeters of mercury, while running at 30,000 revolutions per minute. A blood pump incorporating the principles of the present invention can pump about 5.5 liters at a pressure of about 135 millimeters of mercury, while running at 9,000 revolutions per minute.

One will appreciate in light of the disclosure herein that an engineer/designer can employ the blades 100, 300, 500 of the present invention in various different applications. By way of example, and not limitation, such applications can include props for boats, planes, helicopters, torpedoes, submarines, or other objects being moved through a fluid. Similarly, additional applications include pumps and other application in which the propeller moves fluid past itself.

In addition to applications in which the propeller imparts energy to a fluid (i.e., moves the fluid), an engineer/designer can employ the propeller blades 100, 300, 500 of the present invention in applications in which energy is extracted from the fluid. For example, an engineer/designer can employ the blades 100, 300, 500 with turbines. Additionally, an engineer/designer can employ the blades 100, 300, 500 of the present invention as part of any propeller application. For example, some additional applications with which an engineer/designer can use the blades 100 of the present invention are a hub-less propeller, a multi-stage pump, and a counter-rotating internal and external propeller system.

An extension of this propeller blade 100 and associated propeller is the shape of a stator that can be placed after the propeller. Stators are usually found in ducted propellers. Their purpose is to turn radial fluid flow into an axial direction as it leaves the propeller blade. Because the present invention contemplates no radial flow to fluid exiting a propeller with blades of the present invention, a stator used with a propeller of the present invention can include a surface that is parallel to radial flow. The described stator surface can therefore be concaved in two axes. The stator can be concave towards the axis of rotation and concave towards the radical flow direction. This surface can be viewed as a hollow dome that changes to a flat surface parallel to the rotational axis extending radially from the center of rotation.

A further extension of the present propeller design includes the design of a following propeller in a counter-rotating propeller system. In a counter-rotating system the second propeller redirects the rotating flow from the first propeller into a flow stream that is non-rotating and parallel to the axis of the propellers. This eliminates the torque vector. Because fluid leaving the propeller is moving faster than the fluid entering the propeller, the second propeller can be smaller than the first propeller and have a lead angle that is larger.

No matter the application with which they are used, one will appreciate that the propeller blades 100, 300, 500 of the present invention can increase efficiency and reduce losses. In particular, the tippet of each blade can redirect radial flow in an axial direction, which can increase the thrust of the propeller. Additionally, the tippet of each blade can reduce the exit flow area of the propeller. Furthermore, the shape (i.e., flat front surface) of the blade can reduce or eliminate cavitation and bow wave impedance.

The present invention may thus be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A propeller blade configured to be attached to a hub of a propeller, the propeller blade comprising:

a body having a base and an upper end, the body comprising a front surface and an opposing back surface each extending laterally between a leading end of the body and a trailing end of the body and longitudinally between the base and the upper end, the back surface of the body being the high positive pressure surface of the body; and a tippet extending longitudinally from the upper end of the body to a top end, the tippet extending laterally between a leading end and a trailing end, the tippet curving from the body in a direction generally away from the front surface and toward the back surface so that the top end between the leading and trailing ends of the tippet overhangs the back surface of the body so as to form a channel extending between the leading and trailing ends of the tippet, the channel having a curve extending between the top end of the tippet and the upper end of the body along a lateral length of the tippet, a radius of curvature of the curve varying along the lateral length of the tippet, the tippet being shaped such that when the propeller blade is radially attached to a hub of a propeller and the propeller is rotated in a fluid about a rotational axis, the tippet:

draws fluid radially inward toward the hub from a radial inlet flow that enters the channel along the lateral length of the tippet as well as along the leading end of the tippet, and redirects the fluid from the radially inward direction to an axial direction that is generally parallel to the rotational axis so as to expel the fluid as an outlet flow that adds to a force moving the propeller forward, such that the leading end of the body and the top end of the tippet respectively form first and second leading edges of the propeller blade along which fluid is concurrently drawn into the propeller, wherein the front surface of the body is planar, the front surface extending between the leading end and the trailing end of the body in a single plane, and wherein the back surface of the body is curved and does not extend in a single plane between the leading end and the trailing end of the body.

2. The blade as recited in claim 1, wherein when the propeller blade is radially attached to the hub of the propeller and the propeller is rotated in the fluid about the rotational axis, the fluid exerts a first Bernoulli force on the front surface of the body that is greater than a second Bernoulli force exerted by the fluid on the back surface of the body due to the back surface being curved and the front surface being planar.

3. The blade as recited in claim 1, wherein a thickness of the blade at the trailing end of the body is greater than a thickness of the blade at the leading end of the body.

4. The blade as recited in claim 1, wherein a distance the tippet extends away from the front surface proximate the leading end of the body is less than a distance the tippet extends away from the front surface proximate the trailing end of the body.

5. A propeller, comprising:

a hub having a rotational axis; and a plurality of blades extending radially outward from the hub, each blade of the plurality of blades comprising:

a body having a base and an upper end, the body comprising a front surface and an opposing back surface each extending laterally between a leading end of the body and a trailing end of the body and longitudinally between the base and the upper end, the back surface of the body being the high positive pressure surface of the body, the leading end forming a first leading edge of the propeller blade along which fluid is drawn into the propeller; and a tippet extending longitudinally from the upper end of the body to a top end, the tippet extending laterally between a leading end and a trailing end, the tippet curving in a direction generally away from the front surface and toward the back surface so that the top end between the leading and trailing ends of the tippet overhangs the back surface of the body so as to form a channel extending between the leading and trailing ends of the tippet, the channel having a curve extending between the top end of the tippet and the upper end of the body along a lateral length of the tippet, a radius of curvature of the curve varying along the lateral length of the tippet, the top end of the tippet between the leading and trailing ends of the tippet forming a second leading edge of the propeller blade along which fluid is drawn into the propeller, the tippet being shaped such that upon rotation of the propeller in a fluid, the tippet:

draws fluid radially inward toward the hub from a radial inlet flow that enters the channel along the top end of the tippet as well as along the leading end of the tippet, and redirects the fluid from the radially inward direction to an axial direction that is generally parallel to the rotational axis so as to expel the fluid as an outlet flow that adds to a force moving the propeller forward, such that fluid is concurrently drawn into the propeller along the leading end of the body and the top end of the tippet respectively acting as the first and second leading edges of the propeller blade, wherein the front surface of the body is planar, the front surface extending between the leading end and the trailing end of the body in a single plane, and wherein the back surface of the body is curved and does not extend in a single plane between the leading end and the trailing end of the body.

6. The propeller as recited in claim 5, wherein the plurality of blades draw fluid radially inward toward the hub from radially beyond an outermost radius of the plurality of blades upon rotation of the propeller in a fluid.

7. The propeller as recited in claim 5, wherein for each blade, all portions of the curve of the tippet are non-parallel to a cylinder concentric to the rotational axis of the hub.

8. The propeller as recited in claim 5, wherein for each blade, the radius of curvature of the curve proximate the leading end of the body is less than the radius of curvature of the curve proximate the trailing end of the body.

9. The propeller as recited in claim 5, wherein for each blade, a thickness of the tippet decreases as the tippet extends longitudinally from the upper end of the body to the top end.

10. The propeller as recited in claim 5, wherein for each blade, the tippet has a front surface and an opposing back surface each extending laterally between the leading and trailing ends of the tippet, the front and back surfaces of the tippet respectively extend longitudinally from the front and back surfaces of the body to the top end of the tippet, and the curve is formed on the back surface of the tippet.

11. The propeller as recited in claim 5, wherein for each blade, a first height of the blade proximate the leading end of the blade is between 1.1 and 3 times larger than a second height of the blade proximate the trailing end of the blade.

12. The propeller as recited in claim 5, wherein for each blade, a distance the tippet extends away from the front surface proximate the leading end of the tippet is less than a distance the tippet extends away from the front surface proximate the trailing end of the tippet.

13. The propeller as recited in claim 5, wherein the plurality of blades draw the fluid radially inward toward the hub from radially beyond an outermost radius of the plurality of blades.

14. The propeller as recited in claim 5, wherein an axial velocity of the expelled fluid is greater than an axial velocity of the drawn fluid.

15. A propeller, comprising:

a hub having a rotational axis; and a plurality of blades extending radially outward from the hub, each blade of the plurality of blades comprising:

a body having a base coupled to the hub and extending radially outward from the hub to an upper end, the body comprising:

a first leading edge and a trailing edge each extending from the base to the upper end; and a front surface and an opposing back surface each extending between the first leading edge and the trailing edge, and between the base and the upper end, the back surface of the body being the high positive pressure surface of the body; and a tippet comprising a front surface and an opposing back surface respectively extending radially outward from the front and back surfaces of the body at the upper end of the body to a top end and laterally between a leading end and a trailing end, the tippet curving generally away from the front surface of the body and toward the back surface of the body as the tippet extends radially outward, so that the back surface of the tippet overhangs the back surface of the body so as to form a channel extending between the leading and trailing end of the tippet, the channel having a curve extending between the top end of the tippet and the upper end of the body along a lateral length of the tippet, the radius of curvature of the curve being varied along the lateral length of the tippet, the top end of the tippet forming a second leading edge between the leading and trailing end of the tippet the back surface of the tippet being shaped such that upon rotation of the propeller in a fluid, the tippet:

draws fluid radially inward toward the hub from a radial inlet flow that enters the channel along the top end of the tippet as well as along the leading end of the tippet, and redirects the fluid in an axial direction so as to expel the fluid as an outlet flow that is parallel to the rotational axis, such that fluid is concurrently drawn into the propeller along the first leading edge of the body and the top end of the tippet acting as the second leading edge wherein the front surface of the body is planar, the front surface extending between the leading end and the trailing end of the body in a single plane, and wherein the back surface of the body is curved and does not extend in a single plane between the leading end and the trailing end of the body.

16. The propeller as recited in claim 15, wherein for each blade, a lateral distance between the leading edge and the trailing edge is greater at the upper end than at the base.

17. The propeller as recited in claim 16, wherein for each blade, the lateral distance between the leading edge and the trailing edge progressively increases from the base to the upper end.

18. The propeller as recited in claim 15, wherein for each blade, a first height of the blade proximate the leading end of the blade is between 1.25 and 1.75 times larger than a second height of the blade proximate the trailing end of the blade.

19. The propeller as recited in claim 15, wherein for each blade, the radial distance between the rotational axis of the hub and the top end of the tippet progressively increases from the trailing edge to the leading edge.

20. The blade as recited in claim 5, wherein when the propeller blade is radially attached to the hub of the propeller and the propeller is rotated in the fluid about the rotational axis, the fluid exerts a first Bernoulli force on the front surface of the body that is greater than a second Bernoulli force exerted by the fluid on the back surface of the body due to the back surface being curved and the front surface being planar.

* * * * *